Oct. 3, 1939.  L. B. WHITE  2,174,769
OIL FILTER AND CONDITION INDICATOR
Filed Sept. 27, 1937
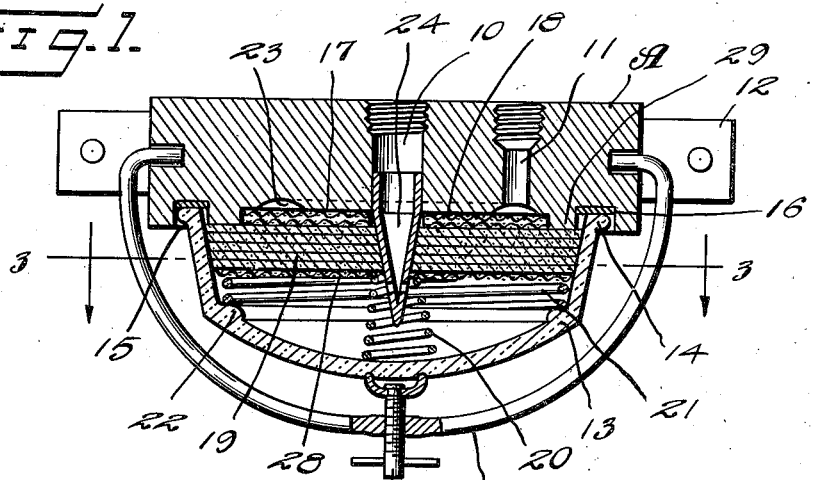
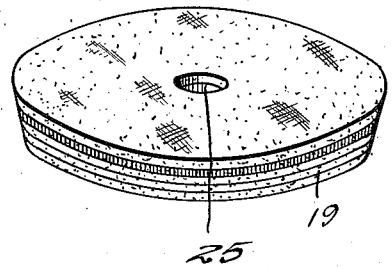
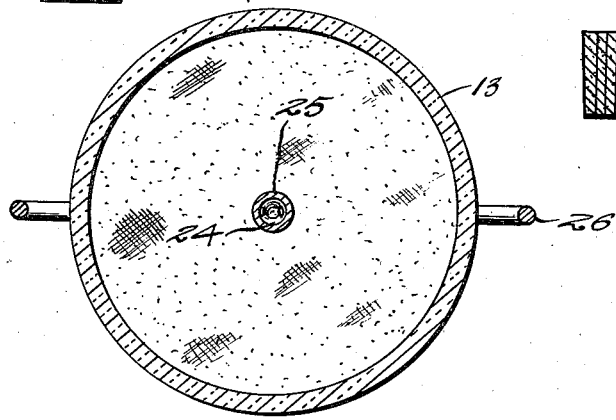
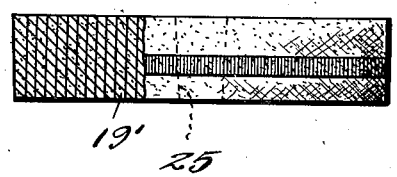
L.B.White
INVENTOR
BY Victor J. Evans & Co.
ATTORNEYS Patented Oct. 3, 1939

2,174,769

UNITED STATES PATENT OFFICE 2,174,769

OIL FILTER AND CONDITION INDICATOR

Lyall B. White, Wisconsin Rapids, Wis.

Application September 27, 1937, Serial No. 165,979

1 Claim. (Cl. 210—165)

The invention relates to a filter and more especially to oil filters and condition indicators for use with lubricating systems of the pressure type.

The primary object of the invention is the provision of a filter of this character, wherein the oil under pressure can be filtered in the use thereof in a thorough manner to remove foreign matter or sludge which is collected from the oil during its use, access being had to the filter in a ready and easy manner so as to enable the cleaning thereof and the renewal of the filtering cartridge employed therewith.

Another object of the invention is the provision of a filter of this character, wherein foreign and heavy particles of impurities will be separated from the oil by gravity and filtration and the condition of such oil is readily discernible in that the filtering cartridge and oil are indicators of such condition.

A further object of the invention is the provision of a filter of this character, wherein the construction thereof is novel in form, being leak-proof and enables ready removal of a cartridge when unfit for use.

A still further object of the invention is the provision of a filter of this character, which is simple in its construction, thoroughly reliable and efficient in operation, strong, durable, and inexpensive to manufacture and install.

With these and other objects in view, the invention consists in the features of construction, combination and arrangement of parts as will be hereinafter more fully described, illustrated in the accompanying drawing, which discloses the preferred and modified forms of embodiment of the invention and pointed out in the claim hereunto appended.

In the accompanying drawing:

Figure 1 is a vertical sectional view illustrating an oil filter constructed in accordance with the invention.

Figure 2 is a perspective view of the cartridge removed.

Figure 3 is a sectional view on the line 3—3 of Figure 1 looking in the direction of the arrows.

Figure 4 is an edge elevation of a modified form of cartridge, being partly in section.

Similar reference characters indicate corresponding parts throughout the several views in the drawing.

Referring to the drawing in detail, A designates generally a head, being of circular form and has formed therein oil flow openings 10 and 11, respectively. In these openings are threaded leads for oil under pressure. Formed on and extending from this head A are attaching brackets 12 capable of permitting the said head to be properly supported in the use of the filter.

In association with the head A is a cup-shaped transparent casing 13 closed at one end and open at the other. At the open end is a thickened rim 14 accommodated within an annular seat provided in the head A, the casing being circular and within this seat is a sealing gasket 16 coacting with the rim 14 to effect a leakproof joint in the fitting of the casing 13 and the head together.

Formed in the head A is an inset center area 17, the seat 15 being concentric thereto and spaced therefrom and this area 17 has common thereto a removable wire mesh screen 18 of disk form having contact with a filtering cartridge 19 made from any suitable filtering material and having a color scheme identifying the dirty or impure condition of oil under treatment by the filter. This cartridge is accommodated within the casing 13 and has acting thereon at its center an inner coiled expansion spring 20 seated on the closed end of the casing interiorly thereof.

Formed interiorly of the casing 13 concentric with respect to the spring 20 and next to the closed end is an outer coiled expansion spring 21 which acts against the cartridge 19 in conjunction with the center or inner spring 20 to hold the said cartridge in place and in contact with the head A. The casing 13 interiorly thereof is formed with an annular shoulder-like seat 22 for the spring 21. Within the area 17 is an annular oil delivery groove 23 opening into the opening 11 while the opening 10 has fitted therein an outwardly tapered perforated discharge tip or nozzle 24 so that oil will be delivered past the filtering cartridge 19 into the casing 13 and thence under pressure will be discharged through the opening 11, being adapted for treatment in this discharge by the filtering cartridge 19. The cartridge 19 has a center opening 25 for the nozzle 24 which is centered and projects into the center or inner spring 20. The outward taper presses the cartridge tight into the center opening 25. The spring 20 in conjunction with the outer spring 21 presses on the screen or perforated disk 18, which in turn presses the cartridge keeping it packed tight to reduce leakage about the nozzle 24 and at the edge of the cartridge next to the casing 13. The taper of the nozzle 24 pressing into the cartridge tightens the same in the opening 25. The taper aided by the spring 20 and oil pressure has a tightening effect tending to reduce leakage along the outside of the taper of the said nozzle. The tip end of the nozzle 24 has holes drilled laterally so oil has a tendency to spread laterally from each hole. This minimizes the stirring of settlings in the bottom of the reservoir or casing 13 and evenly distributes oil to the cartridge.

The casing 13 has an inner taper corresponding to the nozzle 24 and this taper formation, when installing a new cartridge, squeezes on the latter, which in conjunction with the spring 21 pressing upon the shoulder 15 aids in the sealing of the casing 13.

The cartridge 19 is of any desired thickness, its texture being of the kind for filtering oil of various grades under various temperatures. Thus varying viscosities and seasonal changes of oil filtering conditions can be more clearly paralleled by supplying the proper cartridge.

Swingingly connected to the head A is a bail-like keeper 26 carrying a set screw 27 manually operated and in this manner the casing 13 is separably fastened and clamped to the head A in proper position for coaction with the cartridge 19 in the filtering of the oil under pressure.

In the treatment of the oil under pressure, the same enters the casing 13 through the nozzle 24 and the heavier particles are trapped within the said casing while the finer particles will be collected on the cartridge 19 so that purified oil will flow into the outlet 11, this flow being assisted by the groove 23 and the screen 18.

The cartridge 19, as has been stated, is tapered to correspond with the taper of the nozzle 24 and the casing 13. The opening 25 is slightly smaller than the nozzle 24 so that the spring pressure and oil pressure upon the cartridge reduces leakage past the nozzle 24. The outside diameter of the cartridge 19 is greater than the inside taper of the casing 13 so that upon installation of the cartridge there is a tight bearing between it and the casing 13 and in this manner reducing leakage between the same.

The casing 13 is preferably made of a transparent material and the same may be replaced by a non-transparent casing as may be desired.

Underlying the cartridge 19 is a wire mesh screen 28 with which contacts the spring 21 while contacts 29 are formed on the head A with which coacts the cartridge 19 so as to aid in sealing against leakage upwardly at the sides of the casing 13. In Figure 4 of the drawing there is shown a slight modification, wherein the cartridge 19' is made from a wound strip of filtering material.

What is claimed is:

A filter of the character described comprising a circular head provided with spaced oil openings and having a circular counterseat in its lower face, said head also provided with an annular channel intersecting said counterseat and one of said openings communicating with the annular channel, a cup-shaped transparent casing interfitted with said head at a point concentric to the said counterseat, a filtering cartridge within said casing and having a portion thereof filling the counterseat, a spring within the casing and engaging peripherally the said cartridge for holding the same in abutment with the lower face of said head, a perforated nozzle fitting the other of said openings and extending through the cartridge with the perforations therein exposed without the latter, and a spring centered within the casing, engaging therewith and with the cartridge concentrically about the nozzle in close relation to the latter.

LYALL B. WHITE.